(12) United States Patent
Kojima

(10) Patent No.: US 12,181,892 B2
(45) Date of Patent: Dec. 31, 2024

(54) AIRCRAFT POSITION CONTROL SYSTEM, AIRCRAFT, AND AIRCRAFT POSITION CONTROL METHOD

(71) Applicant: MITSUBISHI HEAVY INDUSTRIES, LTD., Tokyo (JP)

(72) Inventor: Toru Kojima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 93 days.

(21) Appl. No.: 17/767,159

(22) PCT Filed: Sep. 1, 2020

(86) PCT No.: PCT/JP2020/033017
§ 371 (c)(1),
(2) Date: Apr. 7, 2022

(87) PCT Pub. No.: WO2021/070518
PCT Pub. Date: Apr. 15, 2021

(65) Prior Publication Data
US 2022/0382298 A1  Dec. 1, 2022

(30) Foreign Application Priority Data
Oct. 11, 2019  (JP) .................... 2019-187987

(51) Int. Cl.
*B64D 45/08* (2006.01)
*B64F 1/02* (2006.01)
(Continued)

(52) U.S. Cl.
CPC ............. *G05D 1/101* (2013.01); *B64D 45/08* (2013.01); *B64U 20/87* (2023.01); *B64U 70/30* (2023.01);
(Continued)

(58) Field of Classification Search
CPC ...... G05D 1/101; G05D 1/0684; B64D 45/08; B64D 47/08; B64C 39/024; B64C 27/04;
(Continued)

(56) References Cited

U.S. PATENT DOCUMENTS 7,373,242 B2    5/2008  Yamane
2007/0016371 A1*  1/2007  Waid ..................... G01S 19/51
                                                    701/470
(Continued)

FOREIGN PATENT DOCUMENTS

| CN | 106227226 | 12/2016 |
| JP | 2005-115623 | 4/2005 |
| JP | 2014141157 A * | 8/2014 |

OTHER PUBLICATIONS

Machine Translation: JP-2014141157-A (Year: 2014).*
(Continued)

*Primary Examiner* — Anne Marie Antonucci
*Assistant Examiner* — Connor L Knight
(74) *Attorney, Agent, or Firm* — Wenderoth, Lind & Ponack, L.L.P.

(57) ABSTRACT

An aircraft position control system includes a processor configured to calculate a feedback manipulated variable of an aircraft by feedback control so that the aircraft heads toward a target landing point, based on at least a relative position and a relative velocity. The processor is further configured to set an addition value, by referring to a switching line preliminarily provided in a manner passing through an origin of a coordinate plane having orthogonal axes representing the relative position and the relative velocity and separating an acceleration region in which the relative velocity is to be increased and a deceleration region in which the relative velocity is to be decreased. The addition value tends to increase the relative velocity when a coordinate point of a current relative position and a current relative (Continued)

velocity is located in the acceleration region to calculate a manipulated variable of the aircraft.

10 Claims, 12 Drawing Sheets

(51) Int. Cl.
*B64U 20/87* (2023.01)
*B64U 70/30* (2023.01)
*B64U 70/92* (2023.01)
*G05D 1/00* (2006.01)
*B64U 101/30* (2023.01)

(52) U.S. Cl.
CPC ............... *B64U 70/92* (2023.01); *B64F 1/02* (2013.01); *B64U 2101/30* (2023.01)

(58) Field of Classification Search
CPC .......... B64C 29/00; B64C 13/18; B64F 1/02; B64U 20/87; B64U 70/30; B64U 70/92; G08G 5/0021; G08G 5/0086; G08G 5/025

See application file for complete search history.

(56) References Cited

U.S. PATENT DOCUMENTS

| | | |
|---|---|---|
| 2017/0001732 A1 | 1/2017 | Lim |
| 2018/0101173 A1* | 4/2018 | Banerjee .................. G06T 7/70 |
| 2018/0224868 A1* | 8/2018 | Lim ...................... G01S 13/882 |
| 2018/0357910 A1* | 12/2018 | Hobbs .................. G05D 1/0676 |
| 2019/0196476 A1* | 6/2019 | Matsuda ................ B64U 30/26 |
| 2020/0201360 A1* | 6/2020 | Blonder ............... G08G 5/0086 |
| 2021/0041896 A1* | 2/2021 | Wang ..................... G05D 1/101 |

OTHER PUBLICATIONS

Extended European Search Report issued Oct. 14, 2022 in corresponding European Patent Application No. 20874823.6.
Alexandre Borowczyk et al., "Autonomous Landing of a Multirotor Micro Air Vehicle on a High Velocity Ground Vehicle", arxiv org, Cornell University Library, 201 Olin Library Cornell University Ithaca, NY 14853, Nov. 22, 2016.
International Search Report issued Nov. 2, 2020 in International (PCT) Application No. PCT/JP2020/033017.

* cited by examiner

AIRCRAFT POSITION CONTROL SYSTEM, AIRCRAFT, AND AIRCRAFT POSITION CONTROL METHOD

TECHNICAL FIELD

The present invention relates to an aircraft position control system, an aircraft, and an aircraft position control method.

BACKGROUND ART

In the related art, there are known techniques for guiding an aircraft to a target point. For example, JP 2005-115623 A discloses a navigation system that performs image processing on image information of a target point acquired by a stereo camera to determine a distance to the target point, calculates a relative position of the aircraft with respect to the target point based on the distance and the attitude angle of the aircraft, and generates navigation information using the relative position.

SUMMARY OF INVENTION

Technical Problem

The navigation system described in JP 2005-115623 A causes the aircraft to descend while controlling the position, altitude, rate of descent or the like of the aircraft based on the navigation information generated using the relative position, so as to cause the aircraft to land on the landing point. Here, the landing point may move in a case where the landing point is a movable body such as a marine vessel, for example. In this case, the navigation system described in JP 2005-115623 A generates navigation information using the relative position, whereby it can grasp the relative position between the aircraft and the landing point, as well as grasping the relative velocity with respect to a fixed landing point. However, JP 2005-115623 A does not allow for appropriate control of the aircraft based on the navigation information in a case where the landing point is moving, and may fail to accurately and quickly control the position of the aircraft such as, for example, the aircraft taking an excessive time to approach the target landing point, or passing over the target landing point.

It is an object of the present invention, which has been made in consideration of the foregoing description, to move the aircraft more accurately and faster toward a target landing point moving relatively thereto.

Solution to Problem

In order to solve the problems described above and achieve the object, an aircraft position control system according to the present invention includes: a relative position acquisition unit configured to acquire a relative position between an aircraft and a target landing point; a relative velocity acquisition unit configured to acquire relative velocity of the aircraft with respect to the target landing point; and a control unit configured to control the aircraft, wherein the control unit has: a feedback control unit configured to calculate a feedback manipulated variable of the aircraft by feedback control so that the aircraft heads toward the target landing point, based on at least the relative position and the relative velocity; a multi-value control unit configured to set, by referring to a switching line preliminarily provided in a manner passing through an origin of a coordinate plane whose orthogonal axes represent the relative position and the relative velocity and separating an acceleration region in which the relative velocity is increased and a deceleration region in which the relative velocity is decreased, an addition value that tends to increase the relative velocity when a coordinate point of the current relative position and the current relative velocity is located in the acceleration region, or set an addition value that tends to decrease the relative velocity when the coordinate point is located in the deceleration region with respect to the switching line; and an addition circuit configured to calculate a manipulated variable of the aircraft by adding the addition value to the feedback manipulated variable.

In order to solve the problems described above and achieve the object, an aircraft position control system according to the present invention includes: a relative position acquisition unit configured to acquire a relative position between an aircraft and a target landing point; a relative velocity acquisition unit configured to acquire relative velocity between the aircraft and the target landing point; and a control unit configured to control the aircraft to head toward the target landing point, based on at least the relative position and the relative velocity, wherein the relative velocity acquisition unit calculates the relative velocity by adding a value acquired by applying, to a differential value of the relative position, a low-pass filter that attenuates frequencies equal to or higher than a cutoff frequency being predetermined, and a value acquired by applying, to the velocity of the aircraft, a high-pass filter that attenuates frequencies below the cutoff frequency.

In order to solve the problems described above and achieve the object, an aircraft according to the present invention includes the aircraft position control system.

In order to solve the problems described above and achieve an object, an aircraft position control method according to the present invention comprising: acquiring a relative position between an aircraft and a target landing point; acquiring relative velocity of the aircraft with respect to the target landing point; calculating a feedback manipulated variable of the aircraft by feedback control so that the aircraft heads toward the target landing point, based on at least the relative position and the relative velocity; setting, by referring to a switching line preliminarily provided in a manner passing through an origin of a coordinate plane whose orthogonal axes represent the relative position and the relative velocity and separating an acceleration region in which the relative velocity is increased and a deceleration region in which the relative velocity is decreased, an addition value that tends to increase the relative velocity when a coordinate point of the current relative position and the current relative velocity is located in the acceleration region, or setting an addition value that tends to decrease the relative velocity when the coordinate point is located in the deceleration region with respect to the switching line; and calculating a manipulated variable of the aircraft by adding the addition value to the feedback manipulated variable.

Advantageous Effects of Invention

The aircraft position control system, the aircraft, and the aircraft position control method according to the present invention exhibits an effect that allows for moving the aircraft more accurately and faster toward a relatively moving target landing point.

DESCRIPTION OF EMBODIMENTS

In the following, detailed description of embodiments of an aircraft position control system, an aircraft, and an aircraft position control method according to the present invention will be provided, based on drawings. Note that, the invention is not limited to the embodiments.

First Embodiment

Figure 1:
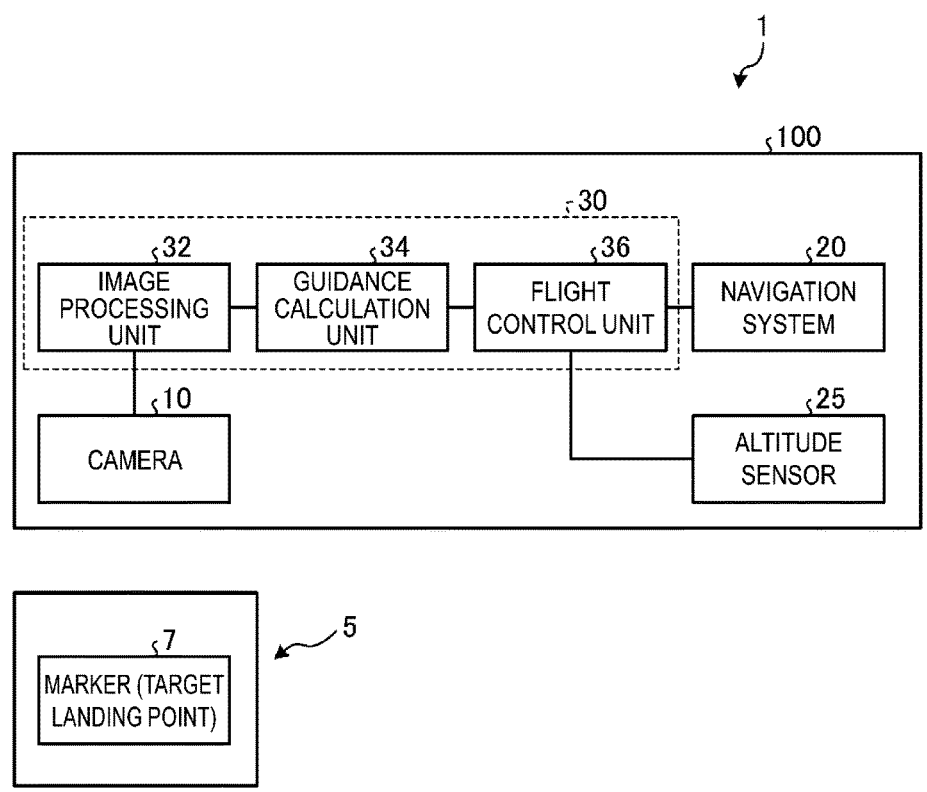
FIG. 1 is a schematic configuration diagram illustrating an example of an aircraft position control system according to a first embodiment.
Figure 2:
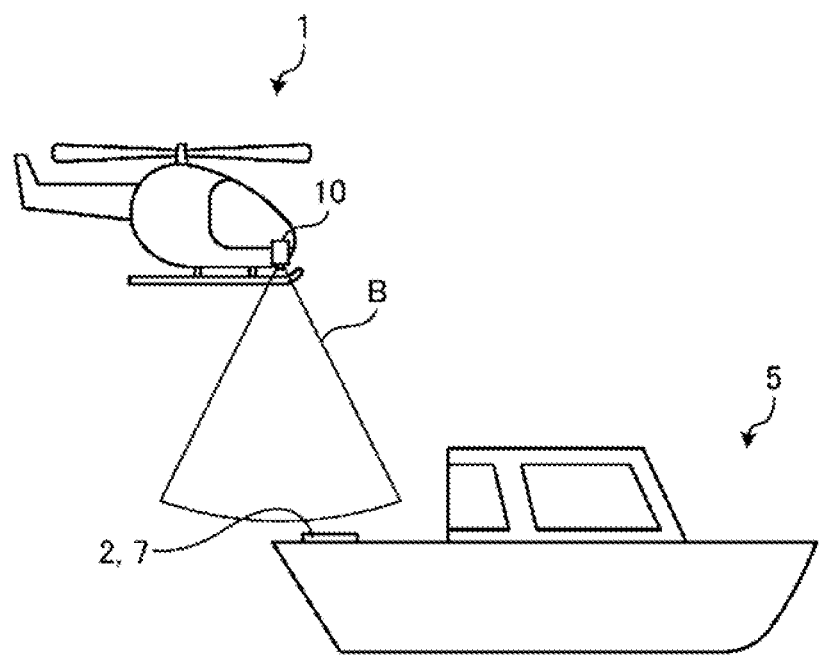
FIG. 2 is an explanatory diagram illustrating an aircraft according to the first embodiment heading toward a target landing point.

FIG. 1 is a schematic configuration diagram illustrating an example of an aircraft position control system according to a first embodiment, and FIG. 2 is an explanatory diagram illustrating an aircraft according to the first embodiment heading toward a target landing point. An aircraft 1 according to the first embodiment is a flying object as a rotorcraft (e.g., helicopter, drone, etc.). In the present embodiment, the aircraft 1 is an unmanned aerial vehicle. Here, the aircraft 1 may be any flying object that can fly forward, fly backward, turn, fly sideways, or hover, and may be a manned aerial vehicle. The aircraft 1 equipped with a position control system 100 is flight-controlled by the position control system 100 so as to land on a target landing point 2 illustrated in FIG. 2.

(Target Landing Point)

In the present embodiment, the target landing point 2 is provided on a marine vessel 5, as illustrated in FIG. 2. Accordingly, the aircraft 1 lands on (touches down) the marine vessel 5, which is a movable body on the water. Here, although not illustrated, the marine vessel 5 has an arresting gear provided thereon for arresting the aircraft 1 when the aircraft 1 lands on the target landing point 2. However, the target landing point 2 is not limited to the marine vessel 5 and may be provided on a vehicle or the like, which is a movable body on the ground, or may be provided on a fixed facility or the ground.

Figure 3:
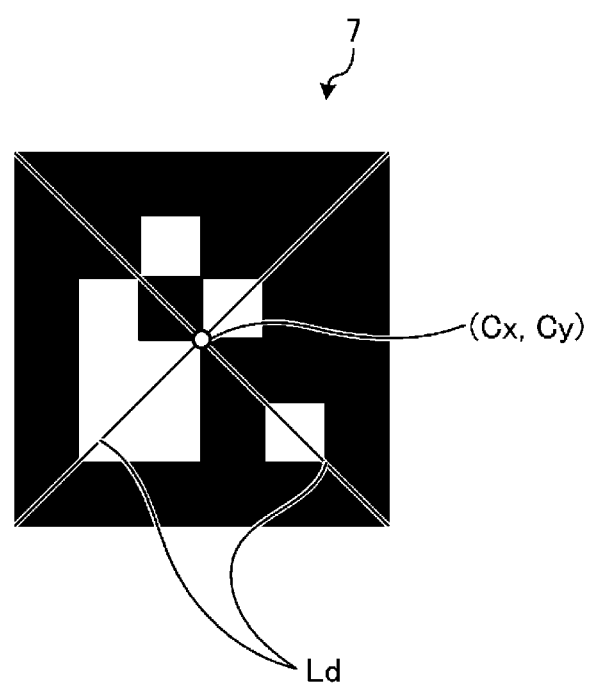
FIG. 3 is an explanatory diagram illustrating an example of a marker provided on the target landing point.

The target landing point 2 has a marker 7 provided thereon that allows the aircraft 1 to recognize the position of the target landing point 2. FIG. 3 is an explanatory diagram illustrating an example of a marker provided on the target landing point. As illustrated, the marker 7 is a square AR marker color-coded with two colors, black and white, for example. Here, the marker 7 is not limited to an AR marker and may be any marker that can recognize the position of the target landing point 2 via image processing, such as, for example, an H mark or an R mark indicating a landing point in a heliport. In addition, the marine vessel 5 may have a plurality of markers of different shapes provided thereon as the marker 7, and the aircraft 1 may be guided toward the target landing point 2 corresponding to any one of the different markers 7.

(Position Control System)

An aircraft position control system 100 according to the first embodiment is a system that controls the position of the aircraft 1 in order to cause the aircraft 1 in flight to land on the target landing point 2. The position control system 100 is mounted on the aircraft 1. The position control system 100 includes, as illustrated in FIG. 1, a camera 10, a navigation system 20, and a control unit 30.

(Imaging Device)

The camera 10 is an imaging device mounted on the aircraft 1 with a gimbal (not illustrated) interposed therebetween. The camera 10 may be a monocular camera, a compound-eye camera, an infrared camera or the like, provided that it can capture an image of the marker 7. The camera 10 is provided in order to capture, from the aircraft 1, an image of the marker 7 provided on the target landing point 2. It is assumed that the camera 10 can adjust the shooting direction via a gimbal (not illustrated). In the present embodiment, the camera 10 is controlled by the control unit 30 so that its shooting range B (see FIGS. 2 and 6) faces directly downward in the vertical direction, for example. Here, the camera 10 may be controlled by the control unit 30 so that its shooting range B faces diagonally forward with respect to the vertical direction. In addition, the camera 10 may be devoid of a gimbal and fixed directly below the body of the aircraft 1 so that the shooting direction faces downward in the vertical direction.

(Navigation System)

The navigation system 20 is an inertial navigation system (INS), for example. Here, although the present embodiment is described applying an inertial navigation system as the navigation system 20, it is not particularly limited thereto and any type of navigation system may be used as the navigation system 20. In addition, the navigation system 20 serves as an inertial navigation system including the global positioning system (GPS) in order to improve the accuracy of position measurement. Although the present embodiment is described applying an inertial navigation system including the GPS, it is not particularly limited to the GPS and any position measurement unit that can accurately measure the position may be used, such as those using the Quasi-Zenith Satellite System, for example, and there may also be a configuration with the position measurement unit such as the GPS being omitted provided that the position can be accurately measured using only the navigation system 20. The navigation system 20 including the GPS acquires attitude angles of the aircraft 1 in the roll, yaw and pitch directions, and aircraft velocity Vh (see FIG. 4), aircraft acceleration a (see FIG. 4), an aircraft heading $\psi_h$ (see FIG. 6), and position coordinates of the aircraft 1. Here, the navigation system 20 may include an attitude angle sensor that detects the attitude angle of the aircraft 1, a velocity detection sensor that detects the aircraft velocity Vh of the aircraft 1, an acceleration detection sensor that detects the aircraft acceleration a of the aircraft 1, and a sensor that detects the aircraft heading $\psi_h$ of the aircraft 1. The navigation system 20 outputs, to the control unit 30, the attitude angle, the aircraft velocity Vh, the aircraft acceleration a, and the position coordinates of the aircraft 1, all of which have been acquired.

In addition, the position control system 100 includes, as illustrated in FIG. 1, an altitude sensor 25 that detects the altitude of the aircraft 1 from the ground level or the water surface. The altitude sensor 25 may use any of a laser altimeter, a radio altimeter, or a barometric altimeter, for example. In addition, these altimeters may also be applied in combination as appropriate, depending on the use environment, i.e., measurement of the altitude from the ground level or the altitude from the sea level. The altitude sensor 25 outputs a detected altitude of the aircraft 1 to the control unit 30. However, the position control system 100 is not limited to the altitude sensor 25, and may be one that calculates a relative altitude between the aircraft 1 and the marine vessel 5 by performing, in an image processing unit 32 described below, image processing on an image including the marker 7 captured by the camera 10.

(Control Unit)

The control unit 30 includes the image processing unit 32, a guidance calculation unit 34, and a flight control unit 36. Here, the control unit 30 includes an imaging control unit (not illustrated) that controls the shooting direction of the camera 10 via a gimbal (not illustrated) provided on the aircraft 1. In the present embodiment, as described above, the camera 10 is adjusted so that the shooting range B faces directly downward in the vertical direction.

(Image Processing Unit)

The image processing unit 32 performs image processing on an image captured by the camera 10 and calculates a center (Cx, Cy) of the marker 7, i.e., the target landing point 2 (see FIG. 3). Here, the center (Cx, Cy) is a coordinate point in a fixed camera coordinate system, with the center of the image captured by the camera 10 being an origin Oc (see FIG. 6), and can be calculated from the number of pixels from the center of the image. The calculation method for the center (Cx, Cy) will be described below. The image processing unit 32 outputs the calculated center (Cx, Cy) of the marker 7 to the guidance calculation unit 34. Here, the target landing point 2 is not limited to the center (Cx, Cy) of the marker 7, and may be any of the four corners of the marker 7, or may be a position offset from the center of the marker 7.

In addition, the image processing unit 32 determines the orientation of the marker 7 by performing image processing on the image including the marker 7 captured by the camera 10, and calculates a ship heading $\psi_s$ (see FIG. 6) of the marine vessel 5 by associating the orientation of the marker 7 with the aircraft heading $\psi_h$ of the aircraft 1 acquired by the navigation system 20. Here, as described above, the image processing unit 32 may calculate the relative altitude between the aircraft 1 and the marine vessel 5 by performing image processing on an image including the marker 7 captured by the camera 10.

(Guidance Calculation Unit)

The guidance calculation unit 34 calculates a manipulated variable C' (see FIG. 4) of the aircraft 1 for guiding the aircraft 1 toward the target landing point 2. The manipulated variable C' is a manipulated variable for adjusting the aircraft velocity Vh, attitude angle, attitude rate, or the like, of the aircraft 1.

Specifically, the guidance calculation unit 34 performs a relative position calculation process of calculating a relative position (Xhg, Yhg) (see FIG. 4) between the aircraft 1 and the target landing point 2, based on the center (Cx, Cy) of the marker 7 calculated by the image processing unit 32, the aircraft heading $\psi_h$, and the altitude of the aircraft 1. Accordingly, the image processing unit 32 and the guidance calculation unit 34 function as a relative position acquisition unit that acquires the relative position (Xhg, Yhg) between the aircraft 1 and the target landing point 2.

In addition, the guidance calculation unit 34 performs a relative velocity calculation process that calculates relative velocity ($\Delta$Vx, $\Delta$Vy) (see FIG. 4) between the aircraft 1 and the target landing point 2 based on the relative position (Xhg, Yhg) and aircraft velocity (Vx, Vy). Accordingly, the guidance calculation unit 34 functions as a relative velocity acquisition unit that acquires the relative velocity ($\Delta$Vx, $\Delta$Vy) between the aircraft 1 and the target landing point 2.

In addition, as described above, the guidance calculation unit 34 calculates the relative altitude with respect to the target landing point 2, based on the altitude of the aircraft 1. Therefore, the altitude sensor 25 and the guidance calculation unit 34 function as a relative altitude acquisition unit that acquires the relative altitude between the aircraft 1 and the target landing point 2. Here, the image processing unit 32 serves as the relative altitude acquisition unit in a case where the relative altitude between the aircraft 1 and the marine vessel 5 is calculated in the image processing unit 32 by performing image processing on the image including the marker 7 captured by the camera 10.

Subsequently, the guidance calculation unit 34, while calculating a feedback manipulated variable C by feedback control (PID control), based on the relative position (Xhg, Yhg), the relative velocity ($\Delta$Vx, $\Delta$Vy), and aircraft acceleration (ax, ay), calculates the manipulated variable C' (see FIG. 4) by adding an addition value D to the feedback manipulated variable C via multi-value control which will be described below. Here, feedback control is not limited to PID control and may be P control, PI control, PD control, or the like. Details of the calculation process in the aforementioned guidance calculation unit 34 will be described below. The guidance calculation unit 34 outputs the calculated manipulated variable C' to the flight control unit 36.

(Flight Control Unit)

The flight control unit 36 controls respective components of the aircraft 1 in accordance with the manipulated variable C' calculated by the guidance calculation unit 34 described below, and assists the aircraft 1 in flight. The flight control unit 36 controls the blade pitch angle, rotational speed or the like of respective rotary blades in accordance with the manipulated variable, and adjusts the aircraft velocity Vh, attitude angle, and attitude rate of the aircraft 1. Accordingly, the aircraft 1 is guided toward the target landing point 2. Note that, although the image processing unit 32 and the guidance calculation unit 34 are described as separate functional units from the flight control unit 36 in the present embodiment, the flight control unit 36, the image processing unit 32, and the guidance calculation unit 34 may be integrated as a single functional unit. In other words, the flight control unit 36 may substitutionally perform processes that have been supposed to be performed by the image processing unit 32 and the guidance calculation unit 34.

(Aircraft Position Control Method)

Figure 4:
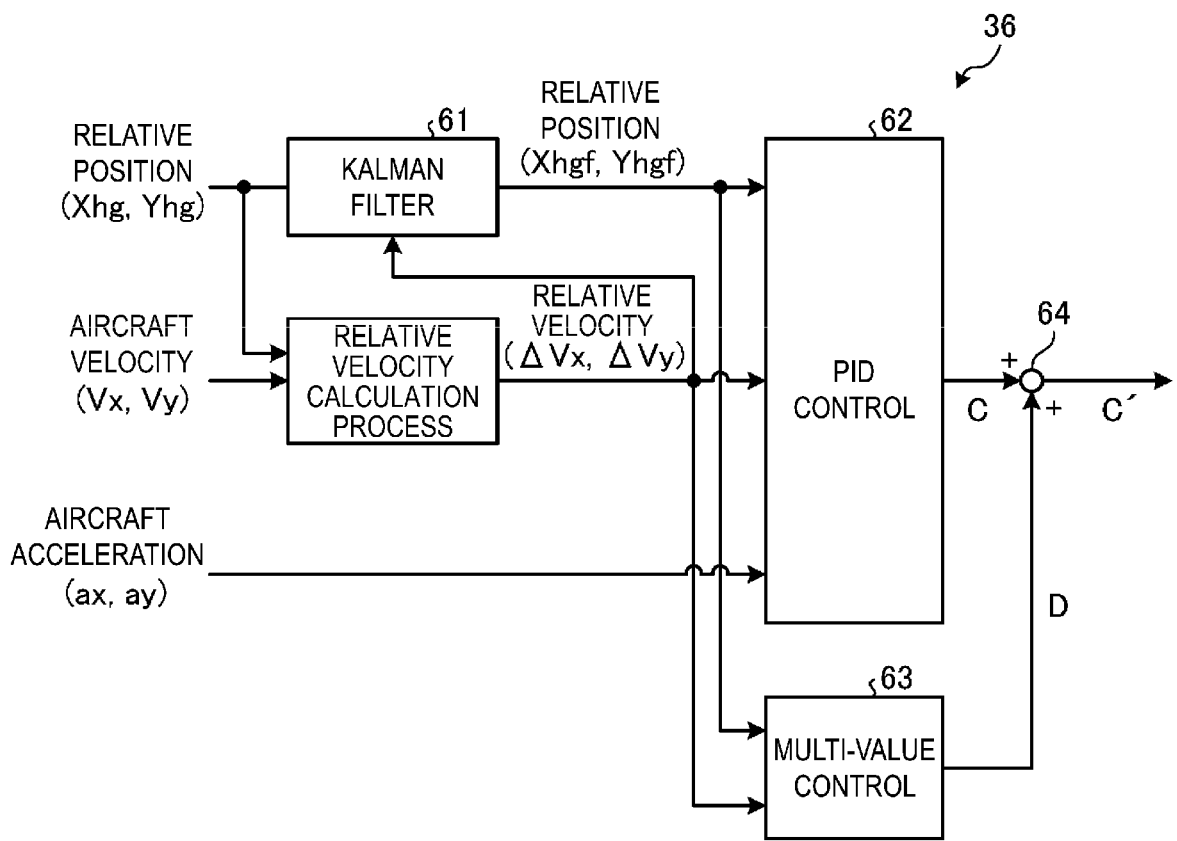
FIG. 4 is a block diagram illustrating an example of a configuration for calculating a manipulated variable of an aircraft by a guidance calculation unit.

Next, a procedure of calculating the manipulated variable C' of the aircraft 1 by the control unit 30 will be described as an aircraft position control method according to embodiments. FIG. 4 is a block diagram illustrating an example of a configuration of calculating the manipulated variable of the aircraft by the guidance calculation unit. According to the block diagram illustrated in FIG. 4, the control unit 30 calculates the manipulated variable of the aircraft 1 for guiding the aircraft 1 toward the target landing point 2. Here, FIG. 4 illustrates both the component in the X direction that serves as the direction of the pitch axis, and the component in the Y direction that serves as the direction of the roll axis, with the manipulated variable of each component being calculated by the guidance calculation unit 34.

(Relative Position Calculation Process)

Figure 5:
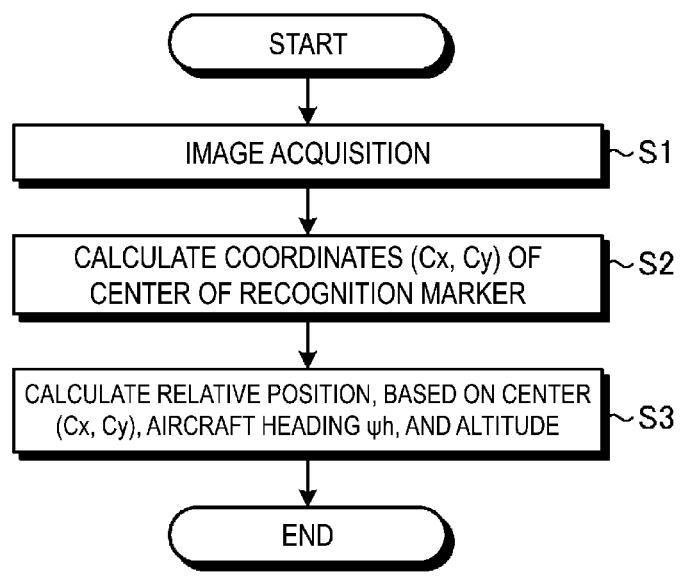
FIG. 5 is a flowchart illustrating an example of a relative position calculation process performed by an image processing unit and the guidance calculation unit.
Figure 6:
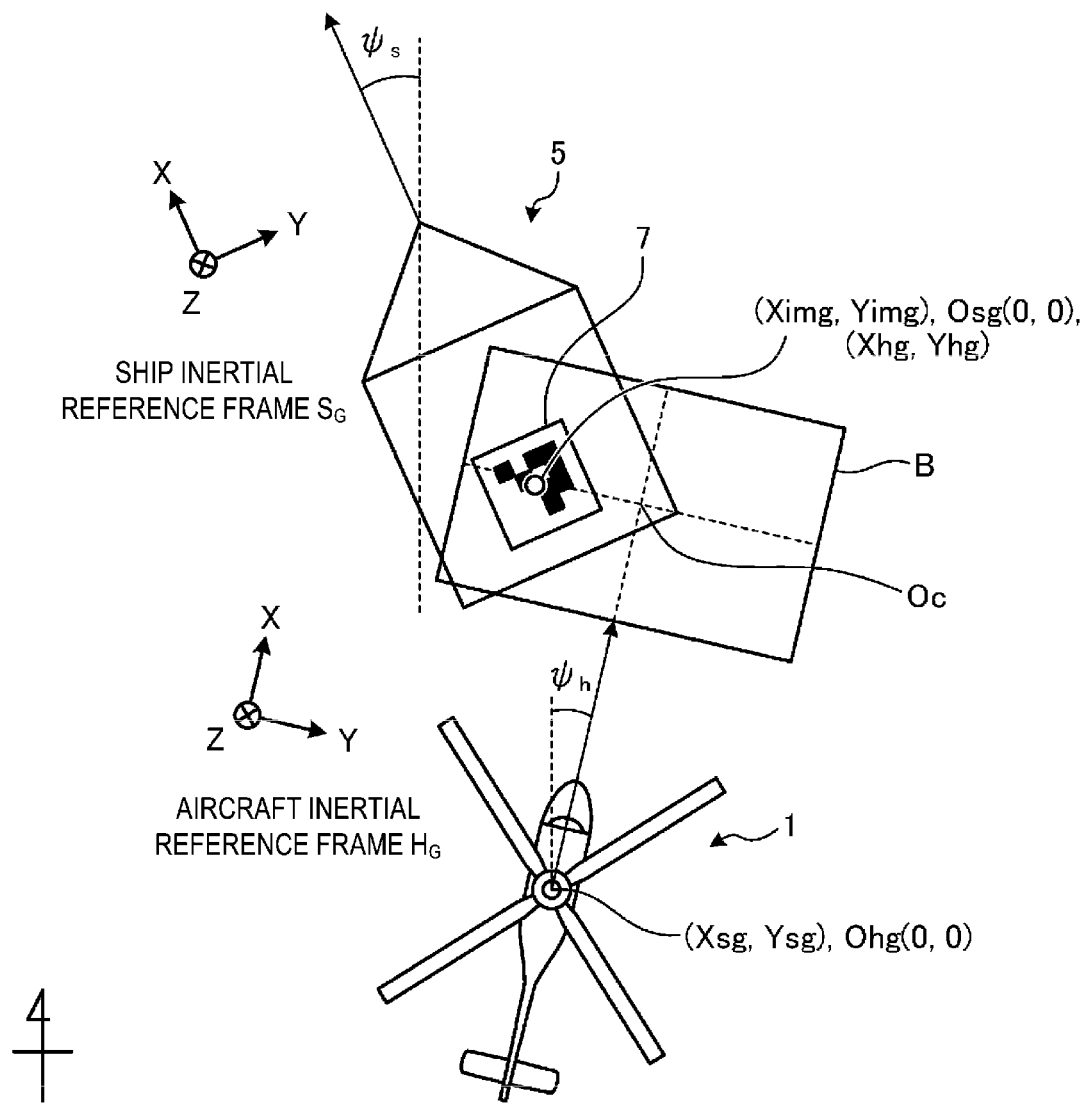
FIG. 6 is an explanatory diagram illustrating an aircraft being guided toward a target landing point.

The control unit 30 performs a relative position calculation process of calculating the relative position (Xhg, Yhg) between the aircraft 1 and the target landing point 2. The relative position calculation process is performed by the image processing unit 32 and the guidance calculation unit 34 according to the procedure illustrated in FIG. 5. FIG. 5 is a flowchart illustrating an example of the relative position calculation process performed by the image processing unit and the guidance calculation unit. The flowchart illustrated in FIG. 5 is repeatedly performed by the image processing unit 32 and the guidance calculation unit 34 at a predetermined time interval. In addition, FIG. 6 is an explanatory diagram illustrating an aircraft being guided toward a target landing point. The following explanation describes calculation of the relative position between the aircraft 1 and the target landing point 2 in the horizontal direction, with the camera 10 having successfully captured the marker 7. The relative altitude of the aircraft 1 with respect to the target landing point 2 is calculated based on the altitude of the aircraft 1 detected by the altitude sensor 25, and is appropriately controlled in accordance with the relative position or the like between the aircraft 1 and the target landing point 2. Additionally, in a case where the aircraft 1 and the marine vessel 5 are separated to an extent that the camera 10 cannot capture the marker 7, the aircraft 1 is assisted to fly toward the marine vessel 5 using, for example, GPS-based position information of each other.

The control unit 30 acquires, in the image processing unit 32, the image captured by the camera 10 (step S1). Next, the control unit 30 calculates, in the image processing unit 32, the center (Cx, Cy) of the marker 7 in the fixed camera coordinate system (step S2). Specifically, as illustrated in FIG. 3, the image processing unit 32 determines, by image processing, two diagonal lines Ld extending between corners of the marker 7, and defines the intersection of the two determined diagonal lines Ld as the center (Cx, Cy) of the marker 7. Here, the image processing unit 32 may determine only one diagonal line Ld, and may define the center position of the length of the determined diagonal line Ld as the center (Cx, Cy) of the marker 7. In addition, the image processing unit 32 may determine two or more diagonal lines Ld, and define a position that is the average of the center position of the determined diagonal lines Ld as the center (Cx, Cy) of the marker 7. Furthermore, the image processing unit 32 may, when performing keystone correction of the marker 7 having a square shape using a projective transformation-based function, calculate the center (Cx, Cy) of the square based on the function. On this occasion, keystone correction may be performed using coordinate points of the four corners of the marker 7, or coordinate points of respective points along the black and white color-coded boundary of the marker 7, and other coordinate points may be calculated by interpolation.

Next, the control unit 30 calculates, in the guidance calculation unit 34, the relative position (Xhg, Yhg) between the aircraft 1 and the target landing point 2 based on the center (Cx, Cy) of the marker 7, orientation of the camera 10, i.e., aircraft heading $\psi_h$ of the aircraft 1, and altitude of the aircraft 1 (relative altitude with respect to the target landing point 2) (step S3). The relative position (Xhg, Yhg) serves as the distance between the aircraft 1 and the target landing point 2 in the horizontal direction. Note that the process at step S3 may be performed by the image processing unit 32. Specifically, the guidance calculation unit 34 first transforms the coordinates of the center (Cx, Cy) of the marker 7 calculated by the image processing unit 32 into a target coordinate point (Ximg, Yimg) in the fixed camera coordinate system.

Next, the guidance calculation unit 34 calculates a relative position (Xsg, Ysg) (see FIG. 6) between the aircraft 1 and the target landing point 2 in a ship inertial reference frame SG (see FIG. 6), based on the following Equations (1) and (2). The ship inertial reference frame SG is a coordinate system with the target landing point 2 being an origin Osg (0, 0), the direction along the ship heading $\psi_s$ of the marine vessel 5 being the X-axis, the direction orthogonal to the ship heading $\psi_s$ in the horizontal direction being the Y axis, and the vertical direction being the Z-axis.

[Math. 1]
$$\begin{bmatrix} Xsg \\ Ysg \end{bmatrix} = R_s \begin{bmatrix} -Ximg \\ -Yimg \end{bmatrix} \quad (1)$$

[Math. 2]
$$R_s = \begin{bmatrix} \cos(\psi_s) & \sin(\psi_s) \\ -\sin(\psi_s) & \cos(\psi_s) \end{bmatrix} \quad (2)$$

Next, the guidance calculation unit 34 calculates the relative position (Xhg, Yhg) (see FIG. 6) between the aircraft 1 and the target landing point 2 in an aircraft inertial reference frame HG (see FIG. 6), based on the following Equations (3) and (4). The aircraft inertial reference frame HG is a coordinate system with the aircraft 1 being the origin Ohg (0, 0), the direction along the aircraft heading $\psi_h$ of the aircraft 1 being the X-axis, the direction orthogonal to the aircraft heading $\psi_h$ in the horizontal direction being the Y-axis, and the vertical direction being the Z-axis. Accordingly, the relative position (Xhg, Yhg) between the aircraft 1 and the target landing point 2 in the aircraft inertial system is calculated in the horizontal direction. The relative position (Xhg, Yhg) is the distance from the aircraft 1 to the target landing point 2.

[Math. 3]
$$\begin{bmatrix} Xhg \\ Yhg \end{bmatrix} = R_{sh}^T \begin{bmatrix} -Xsg \\ -Ysg \end{bmatrix} \quad (3)$$

[Math. 4]
$$R_{sh} = \begin{bmatrix} \cos(\psi_s - \psi_h) & \sin(\psi_s - \psi_h) \\ -\sin(\psi_s - \psi_h) & \cos(\psi_s - \psi_h) \end{bmatrix} \quad (4)$$

(Relative velocity Calculation Process)

Figure 7:
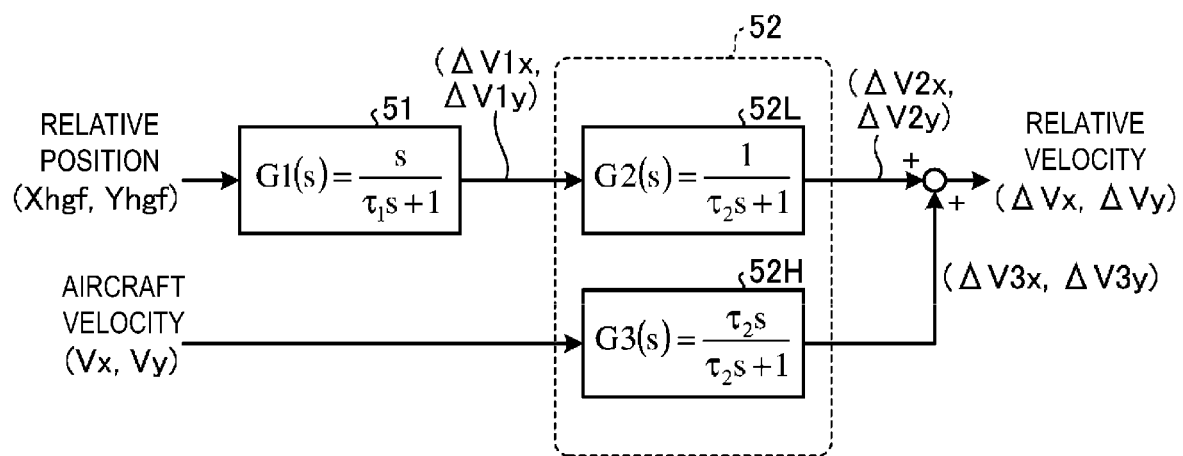
FIG. 7 is a block diagram illustrating an example of a relative velocity calculation process performed by the guidance calculation unit.

In addition, the control unit 30 performs, in the guidance calculation unit 34, a relative velocity calculation process of calculating the relative velocity (ΔVx, ΔVy) of the aircraft 1 with respect to the target landing point 2, i.e., the marine vessel 5, in accordance with the block diagram illustrated in FIG. 7. FIG. 7 is a block diagram illustrating an example of a relative velocity calculation process performed by the guidance calculation unit. Here, FIG. 7 also illustrates both the component in the X direction that serves as the direction of the pitch axis, and the component in the Y direction that serves as the direction of the roll axis. Specifically, the guidance calculation unit 34 calculates the relative velocity (ΔVx, ΔVy) based on the relative position (Xhg, Yhg) between the aircraft 1 and the target landing point 2, and the aircraft velocity (Vx, Vy) of the aircraft 1 detected by the navigation system 20.

The guidance calculation unit 34 first calculates, as illustrated in FIG. 7, the relative velocity (ΔV1x, ΔV1y) between the aircraft 1 and the target landing point 2, by differentiating the relative position (Xhg, Yhg) between the aircraft 1 and the target landing point 2. In the present embodiment, the relative position (Xhg, Yhg) is subject to pseudo-differential operation using a pseudo-differential filter 51. A transfer function G1(s) of the pseudo-differential filter is represented by the following Equation (5). In Equation (5), the symbol "s" is an operator, and "τ1" is a time constant.

$$G1(s)=s/(\tau 1 \cdot s+1) \tag{5}$$

Using the relative velocity (ΔV1x, ΔV1y) calculated by the pseudo-differential filter 51, such as that of Equation (5), for subsequent control may result in decreased controllability due to primary delay. Therefore, the guidance calculation unit 34 uses a complementary filter 52 to calculate the relative velocity (ΔVx, ΔVy), as illustrated in FIG. 7. The complementary filter 52 includes a low-pass filter 52L and a high-pass filter 52H.

The guidance calculation unit 34 applies a low-pass filter 52L to the relative velocity (ΔV1x, ΔV1y) calculated by the pseudo-differential filter 51, and calculates relative velocity (ΔV2x, ΔV2y) having attenuated frequencies equal to or higher than a predetermined cutoff frequency. A transfer function G2(s) of the low-pass filter 52L is represented by Equation (6). In Equation (6), the symbol "s" is an operator, and "τ2" is a time constant. The predetermined cutoff frequency turns out to be "1/τ2". Accordingly, it is possible to acquire the relative velocity (ΔV2x, ΔV2y) reflecting relatively reliable and moderate variation of the relative velocity (ΔV1x, ΔV1y), i.e., having a value in a low-frequency range, which is equal to or lower than the predetermined cutoff frequency.

$$G2(s)=1/(\tau 2 \cdot s+1) \tag{6}$$

In addition, the guidance calculation unit 34 applies the high-pass filter 52H to the aircraft velocity (Vx, Vy) of the aircraft 1 detected by the navigation system 20, and calculates relative velocity (ΔV3x, ΔV3y) having attenuated frequencies below a predetermined cutoff frequency. A transfer function G3(s) of the high-pass filter 52H is represented by Equation (7). In Equation (7), the symbol "s" is an operator, and "τ2" is a time constant in common with the low-pass filter 52L. Therefore, the predetermined cutoff frequency turns out to be "1/τ2" also in the high-pass filter 52H. In other words, variation of the short-term relative velocity (ΔVx, ΔVy) is estimated to have been generated by variation of the aircraft velocity (Vx, Vy) itself of the aircraft 1, and the value acquired by applying the high-pass filter 52H to the aircraft velocity (Vx, Vy) is estimated to be the value of the relative velocity (ΔVx, ΔVy) in the high-frequency range. Subsequently, the guidance calculation unit 34 calculates the value acquired by adding the relative velocity (ΔV2x, ΔV2y) and the relative velocity (ΔV3x, ΔV3y) as the relative velocity (ΔVx, ΔVy). Accordingly, it becomes possible to accurately calculate the relative velocity (ΔVx, ΔVy) by adding, to the relative velocity (ΔV2x, ΔV2y) with values in a high-frequency range having been cut-off to achieve an increased reliability, the relative velocity (ΔV3x, ΔV3y) estimated to be a value in the high-frequency range.

$$G3(s)=\tau 2 \cdot s/(\tau 2 \cdot s+1) \tag{7}$$

(PID Control)

Let us return to explanation of FIG. 4. The guidance calculation unit 34, having calculated the relative position (Xhg, Yhg) and the relative velocity (ΔVx, ΔVy) in a manner described above, applies a Kalman filter 61 to the calculated relative position (Xhg, Yhg) and the relative velocity (ΔVx, ΔVy), and calculates a relative position (Xhgf, Yhgf) with noise removed and error reduced. Here, the Kalman filter 61 may be omitted. Subsequently, the guidance calculation unit 34 performs PID control by a PID control unit 62 (feedback control unit) using the relative position (Xhgf, Yhgf), the relative velocity (ΔVx, ΔVy), and the aircraft acceleration (ax, ay) and calculates a feedback manipulated variable C. Specifically, the guidance calculation unit 34 calculates the feedback manipulated variable C of the aircraft 1 by PID control so that the relative position (Xhgf, Yhgf) corresponding to the distance in the horizontal direction between the aircraft 1 and the target landing point 2 becomes 0. Accordingly, the feedback manipulated variable C can be determined so that the aircraft 1 is guided toward the target landing point 2 and the aircraft 1 becomes relatively stationary with respect to the marine vessel 5 directly above the target landing point 2. In addition, the guidance calculation unit 34 calculates the feedback manipulated variable C of the aircraft 1 by PID control so that values of the relative velocity (ΔVx, ΔVy) and the aircraft acceleration (ax, ay) become 0. Accordingly, the accuracy with regard to guidance of the aircraft 1 toward the target landing point 2 can be improved. Note that, although it is assumed that the PID control uses the aircraft acceleration (ax, ay) in the present embodiment, it suffices that the PID control is performed based on at least the relative position and the relative velocity between the aircraft 1 and the target landing point 2.

In addition, the guidance calculation unit 34 may skip the integration operation of PID control when the relative velocity (ΔVx, ΔVy) is equal to or higher than a predetermined value. In the present embodiment, a relatively high gain of the integration operation of PID control is set when the aircraft 1 is relatively stationary with respect to the target landing point 2, in consideration of canceling the force that the aircraft 1 receives from surrounding wind. Here, when the force of wind being received by the aircraft 1 has weakened, the aircraft 1 may temporarily transit from the relatively stationary state and, being balanced with the force of wind at a certain position, return to the stationary state again. On this occasion, the feedback manipulated variable C for causing the aircraft 1 to return to the target landing point 2 is calculated by the integration operation of PID control. Accordingly, although the integration operation of PID control is a necessary component, a relatively high gain is set as described above, and therefore the value calculated by the integration operation may be too large when the relative velocity (ΔVx, ΔVy) is high, which may result in occurrence of overshooting that causes the aircraft 1 to pass through the target landing point 2. Therefore, skipping the integration operation of PID control when the relative velocity (ΔVx, ΔVy) is equal to or higher than a predetermined value allows for suppressing overshooting even when the integration gain is set to be relatively large.

(Multi-Value Control)

Furthermore, the guidance calculation unit 34 performs, by a multi-value control unit 63 in parallel with PID control, a multi-value control of setting the addition value D to be added to the feedback manipulated variable C. The multi-value control unit 63 receives the relative position (Xhgf, Yhgf) and the relative velocity (ΔVx, ΔVy) input thereto. The multi-value control unit 63 calculates the addition value D, based on the input relative position (Xhgf, Yhgf) and the relative velocity (ΔVx, ΔVy).

Figure 8:
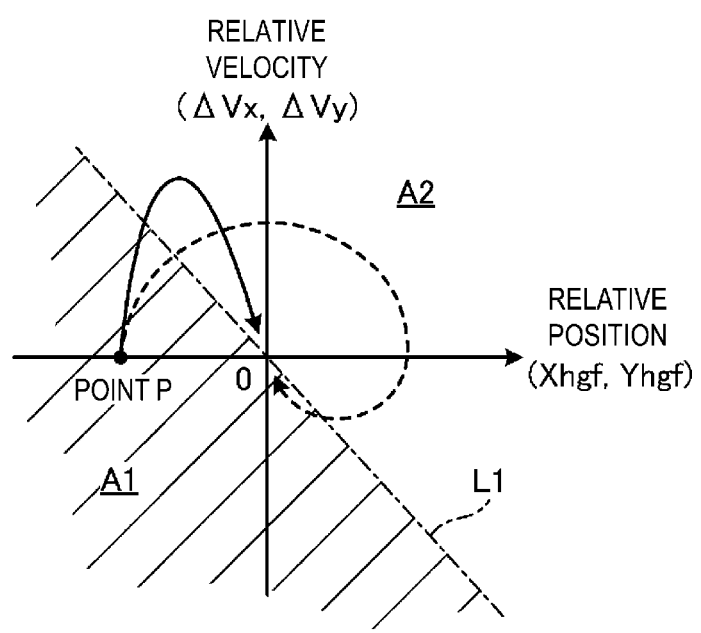
FIG. 8 is an explanatory diagram illustrating a coordinate plane whose orthogonal axes represent the relative position and the relative velocity.

FIG. 8 is an explanatory diagram illustrating a coordinate plane with the relative position and the relative velocity being orthogonal axes. The horizontal axis represents the relative position (Xhgf, Yhgf) and the vertical axis represents the relative velocity (ΔVx, ΔVy). Here, FIG. 8 also illustrates both the component in the X direction that serves as the direction of the pitch axis, and the component in the Y direction that serves as the direction of the roll axis. The relative position (Xhgf, Yhgf) here corresponds to the distance from the aircraft 1 to the target landing point 2, which is assumed to be positive (right direction) when the aircraft 1 is ahead of the target landing point 2 in the forward direction of the aircraft 1, or negative (left direction) when the aircraft 1 is behind the target landing point 2 in the forward direction of the aircraft 1. In addition, the relative velocity (ΔVx, ΔVy) here is assumed to be positive (upward direction) when the aircraft velocity (Vx, Vy) of the aircraft 1 is higher than the velocity of the marine vessel 5, and negative (downward direction) when the aircraft velocity (Vx, Vy) of the aircraft 1 is lower than the velocity of the marine vessel 5. Accordingly, the origin of the coordinate plane indicates a coordinate point at which the aircraft 1 is directly above the target landing point 2 and relatively stationary with respect to the target landing point 2. Note that the positive and negative signs may be reversed with respect to the relative position (Xhgf, Yhgf) and the relative velocity (ΔVx, ΔVy). FIG. 8 illustrates an example of a coordinate point P of the current relative position (Xhgf, Yhgf) and the current relative velocity (ΔVx, ΔVy).

The coordinate plane has preliminarily set thereon a switching line L1 passing through the origin and separating the plane into an acceleration region A1 (the range indicated by diagonal lines in FIG. 8) in which the relative velocity (ΔVx, ΔVy) is increased and a deceleration region A2 (the range without diagonal lines in FIG. 8) in which the relative velocity (ΔVx, ΔVy) is decreased. The switching line L1 is a straight line passing through the origin of the coordinate plane and extending between a quadrant in which the aircraft velocity (Vx, Vy) of the aircraft 1 is higher than the velocity of the marine vessel 5 (velocity of target landing point 2) and also the aircraft 1 is behind the target landing point 2 in the forward direction, and a quadrant in which the aircraft velocity (Vx, Vy) of the aircraft 1 is lower than the velocity of the marine vessel 5, and also the aircraft 1 is ahead of the target landing point 2 in the forward direction. Therefore, in this embodiment, the switching line L1 passes through the origin and extends between the second quadrant and the fourth quadrant, as illustrated in FIG. 8. The angle of the switching line L1 is not limited to that illustrated in FIG. 8, and may be set by the user as appropriate. For example, although increasing the angle of the switching line L1 (tilting toward the relative velocity side) increases the aircraft velocity (Vx, Vy) of the aircraft 1 returning to the target landing point 2, it also increases the likelihood of overshooting and therefore the angle is set to an appropriate inclination.

Figure 9:
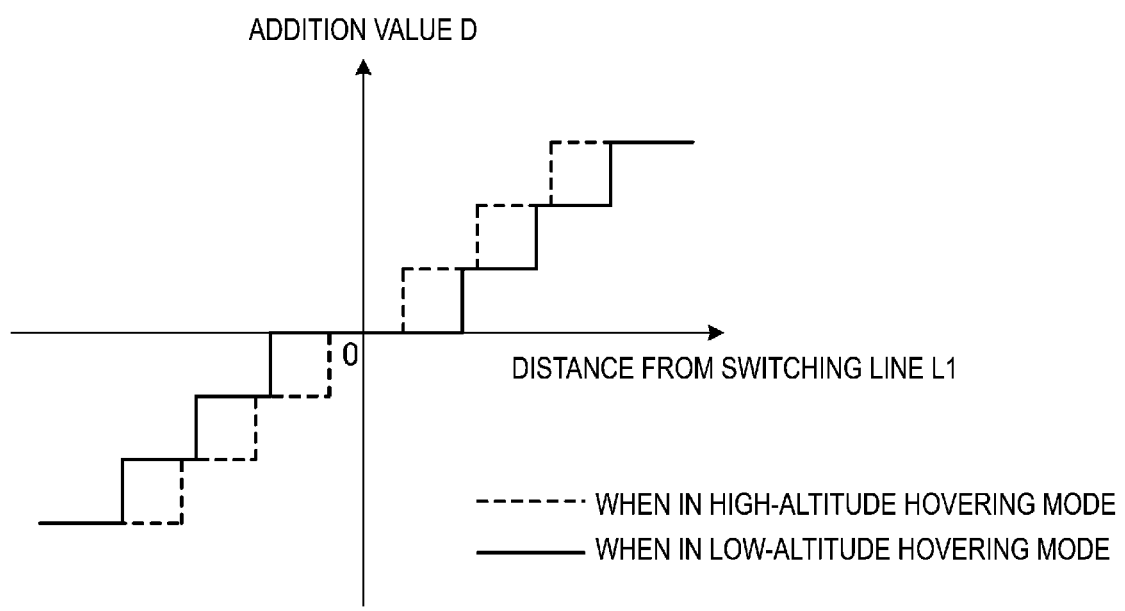
FIG. 9 is an explanatory diagram illustrating an example of a map defining an addition value to be set in multi-value control.

FIG. 9 is an explanatory diagram illustrating an example of a map defining an addition value to be set in multi-value control. In FIG. 9, the horizontal axis represents the distance from the switching line L1 to the current coordinate point P on the coordinate plane of FIG. 8, and the vertical axis represents the addition value D to be set. The distance from the switching line L1 to the current coordinate point P is positive when the current coordinate point P is located in the acceleration region A1, and negative when the current coordinate point P is located in the deceleration region A2. In the present embodiment, the addition value D, when taking a positive value, is set to a trend that increases the relative velocity (ΔVx, ΔVy), i.e., a trend that increases the velocity of the aircraft 1 in the forward direction. Additionally, in the present embodiment, the addition value D, when taking a negative value, is set to a trend that reduces the relative velocity (ΔVx, ΔVy), i.e., a trend that reduces the velocity of the aircraft 1 in the forward direction or increases the same in the backward direction. In addition, as indicated by the solid line in the drawing, the addition value D is set in a stepwise manner so that its absolute value becomes larger for a further distance between the coordinate point P and the switching line L1, or smaller for a closer distance between the coordinate point P and the switching line L1.

The multi-value control unit 63 sets the addition value D illustrated in FIG. 9 in accordance with the distance between the switching line L1 and the coordinate point P of the relative position (Xhgf, Yhgf) and relative velocity (ΔVx, ΔVy), and adds, in an addition circuit 64, the addition value D to the feedback manipulated variable C calculated by the PID control unit 62, as illustrated in FIG. 4. Subsequently, the guidance calculation unit 34 outputs, to the flight control unit 36, the manipulated variable C' to which the addition value D has been added.

Accordingly, when the coordinate point P is located in the acceleration region A1, the flight of the aircraft 1 is controlled by the manipulated variable C' having added thereto the addition value D that tends to increase the relative velocity (ΔVx, ΔVy). Consequently, as illustrated by the solid line in FIG. 8, the relative velocity (ΔVx, ΔVy) becomes larger than the case where the aircraft 1 flies according to the feedback manipulated variable C without the addition value D illustrated by the dashed line in FIG. 8 added thereto. In other words, the aircraft velocity (Vx, Vy) of the aircraft 1 rapidly increases, reducing the time required to travel a same distance. When, on the other hand, the coordinate point P crosses the switching line L1 and reaches the deceleration region A2, the flight of the aircraft 1 is controlled by the manipulated variable C' having added thereto the addition value D that tends to decrease the relative velocity (ΔVx, ΔVy). Consequently, as illustrated by the solid line in FIG. 8, although the relative velocity (ΔVx, ΔVy) indicated by the solid line becomes higher than the relative velocity indicated by the dashed line immediately after the coordinate point P moved from the acceleration region A1 to the deceleration region A2 across the switching line L1, the relative velocity indicated by the solid line becomes lower than the relative velocity indicated by the dashed line as the aircraft 1 approaches the target landing point 2. In other words, the aircraft velocity (Vx, Vy) of the aircraft 1 rapidly decelerates, thereby suppressing overshooting that causes the aircraft 1 to pass through the origin of the coordinate plane.

In addition, a plurality of addition values D may be set in accordance with the altitude of the aircraft 1 (relative altitude with respect to the target landing point 2). For example, when the aircraft 1 is located directly above the target landing point 2 at a predetermined altitude (e.g., in a range of 3 m or more and 8 m or less with respect to the target landing point 2) (e.g., in a low-altitude hovering mode described below), the absolute value of the addition value D may be set larger than the value in the normal time indicated by the solid line (e.g., in a high-altitude hovering mode described below), as illustrated by the dashed line in FIG. 9. On this occasion, setting of the addition value D may be gradually changed in accordance with the value of the altitude. Accordingly, the manipulated variable C' of the aircraft 1 can be more accurately calculated in the vicinity of the target landing point 2 where the aircraft 1 lands on, thereby facilitating accurate landing on the target landing point 2.

Similarly, a plurality of the addition values D may be set in accordance with the control mode of the aircraft 1. For example, let us consider a case where there are set, as the control mode for the aircraft 1, a high-altitude hovering mode that maintains the relative altitude with respect to the target landing point 2 at a first relative altitude (e.g., 8 m) directly above the target landing point 2, and a low-altitude hovering mode that lowers the relative altitude with respect to the target landing point 2 from the high-altitude hovering mode to a second relative altitude (e.g., 3 m) directly above the target landing point 2. Here, transition from the high-altitude hovering mode to the low-altitude hovering mode can be performed under a condition that the relative position (Xhgf, Yhgf) is equal to or lower than a predetermined threshold value, and also the operator has instructed mode transition. In addition, transition from the high-altitude hovering mode to the low-altitude hovering mode may be performed under a condition that, in place of instructing mode transition by the operator, the attitude rate, the attitude angle, the relative velocity ($\Delta Vx$, $\Delta Vy$) of the aircraft 1, the angle of the target landing point 2 in the horizontal direction, the altitude of the aircraft 1 with respect to the target landing point 2, the relative altitude with respect to the target landing point 2, or the like are equal to or lower than a predetermined value.

In a case where such a high-altitude hovering mode and a low-altitude hovering mode have been set, setting of the addition value D is switched after a first predetermined time period (e.g., 5 seconds) has elapsed since transition from the high-altitude hovering mode to the low-altitude hovering mode started. In other words, the addition value D is switched from the value indicated by the solid line in FIG. 9 to the value indicated by the dashed line in FIG. 9. On this occasion, the addition value D may be set so as to gradually change during a second predetermined time period (e.g., 3 seconds). Accordingly, the manipulated variable C' of the aircraft 1 can be more accurately calculated in the vicinity of the target landing point 2 where the aircraft 1 lands on, thereby facilitating accurate landing on the target landing point 2.

Effect and Advantage of First Embodiment

As has been described above, the aircraft position control system 100 according to the first embodiment includes: the image processing unit 32 and the guidance calculation unit 34 (relative position acquisition unit) that acquires the relative position (Xhgf, Yhgf) between the aircraft 1 and the target landing point 2; a guidance calculation unit 34 (relative velocity acquisition unit) that acquires the relative velocity ($\Delta Vx$, $\Delta Vy$) of the aircraft 1 with respect to the target landing point 2; and the control unit 30 that controls the aircraft 1. The control unit 30 includes, in the guidance calculation unit 34: the PID control unit 62 (feedback control unit) that calculates the feedback manipulated variable C of the aircraft 1 by feedback control so that the aircraft 1 is directed toward the target landing point 2 based on at least the relative position (Xhgf, Yhgf) and the relative velocity ($\Delta Vx$, $\Delta Vy$); the multi-value control unit 63 that sets, by referring to a switching line L1 preliminarily provided in a manner passing through an origin (0.0) of a coordinate plane whose orthogonal axes represent the relative position (Xhgf, Yhgf) and the relative velocity ($\Delta Vx$, $\Delta Vy$) and separating an acceleration region A1 in which the relative velocity ($\Delta Vx$, $\Delta Vy$) is increased and a deceleration region A2 in which the relative velocity is decreased ($\Delta Vx$, $\Delta Vy$), the addition value D that tends to increase at least the relative velocity ($\Delta Vx$, $\Delta Vy$) when the coordinate point P of the current relative position (Xhgf, Yhgf) and the current relative velocity ($\Delta Vx$, $\Delta Vy$) is located in the acceleration region A1, or sets the addition value D that tends to decrease at least the relative velocity ($\Delta Vx$, $\Delta Vy$) when the coordinate point P is located in the deceleration region A2 with respect to the switching line L1; and the addition circuit 64 that calculates the manipulated variable C' of the aircraft 1 by adding the addition value D to the feedback manipulated variable C.

According to the aforementioned configuration, the flight of the aircraft 1 is controlled by the manipulated variable C' having added thereto the addition value D that tends to increase the relative velocity ($\Delta Vx$, $\Delta Vy$), whereby the relative velocity $\Delta V$ increases, when the coordinate point P of the current relative position (Xhgf, Yhgf) and the current relative velocity ($\Delta Vx$, $\Delta Vy$) is located in the acceleration region A1 separated by the switching line L1 on a coordinate plane whose orthogonal axes represent the relative position (Xhgf, Yhgf) and the relative velocity ($\Delta Vx$, $\Delta Vy$). As a result, the aircraft 1 can be moved fast. When, on the other hand, the current coordinate point P is located in the deceleration region A2 separated by the switching line L1, the flight of the aircraft 1 is controlled by the manipulated variable C' having added thereto the addition value D, which tends to decrease the relative velocity ($\Delta Vx$, $\Delta Vy$), whereby the relative velocity $\Delta V$ decreases. As a result, overshooting that causes the aircraft 1 to pass through the target landing point 2 can be suppressed. Therefore, according to the aircraft 1, the aircraft position control system 100, and the position control method according to the first embodiment, the aircraft 1 can be moved more accurately and faster toward the target landing point 2. Accordingly, accurately controlling the position of the aircraft 1 with respect to the target landing point 2 allows for suppressing interference between the aircraft 1 and a device or a structure provided in the vicinity of the target landing point 2.

In addition, the switching line L1 is a straight line extending over the coordinate plane between a quadrant in which the aircraft velocity (Vx, Vy) of the aircraft 1 is higher than the velocity of target landing point 2 (velocity of the marine vessel 5) and also the aircraft 1 is behind the target landing point 2 in the forward direction, and a quadrant in which the aircraft velocity (Vx, Vy) of the aircraft 1 is lower than the velocity of the target landing point 2, and also the aircraft 1 is ahead of the target landing point 2 in the forward direction. According to the aforementioned configuration, it is possible to appropriately set the acceleration region A1 and the deceleration region A2, and set the addition value D to an appropriate value.

In addition, the addition value D is set in a stepwise manner so that its absolute value becomes larger for a larger distance on the coordinate plane between the switching line L1 and the coordinate point P of the current relative position (Xhgf, Yhgf) and the current relative velocity ($\Delta$Vx, $\Delta$Vy), or smaller for a closer distance.

Figure 10:
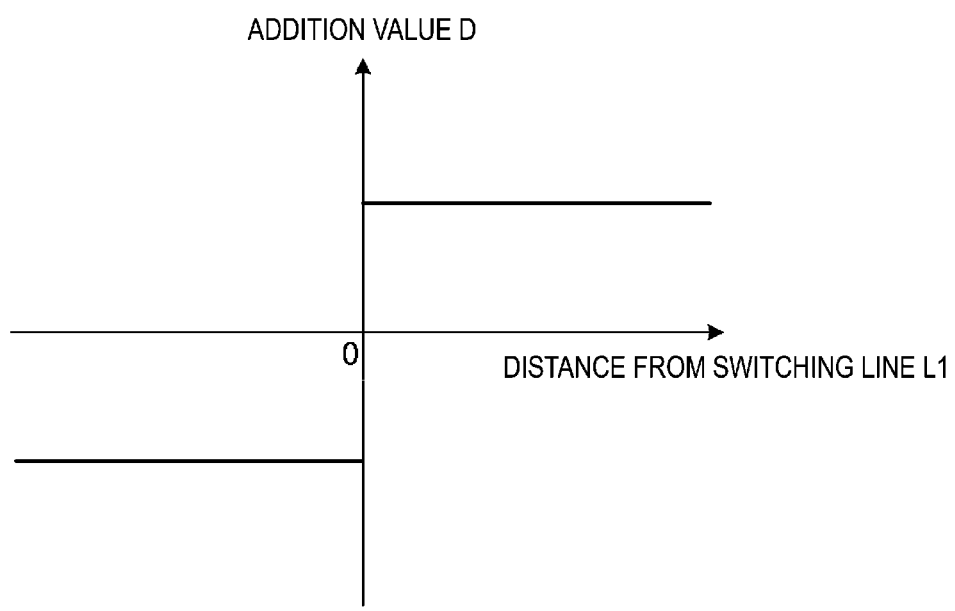
FIG. 10 is an explanatory diagram illustrating another example of a map defining an addition value to be set in multi-value control.

According to the aforementioned configuration, the addition value D is set larger for a further distance between the switching line L1 and the coordinate point P of the current relative position (Xhgf, Yhgf) and the current relative velocity ($\Delta$Vx, $\Delta$Vy) so that the aircraft 1 moves fast, or smaller for a closer distance between the current coordinate point P and the switching line L1 so that the aircraft 1 can be finely manipulated. However, the manner of setting the addition value D is not limited to the foregoing. FIG. 10 is an explanatory diagram illustrating another example of a map defining an addition value to be set in multi-value control. As illustrated, the addition value D may be a positive constant value in the acceleration region A1, or a negative constant value in the deceleration region A2, regardless of the distance between the current coordinate point P and the switching line L1.

In addition, the PID control unit 62 (feedback control unit), having calculated the feedback manipulated variable by PID control, skips the integration operation of PID control when the relative velocity ($\Delta$Vx, $\Delta$Vy) is equal to or higher than a predetermined value. According to the aforementioned configuration, in case where a relatively large integrated gain of PID control has been set, it is possible to suppress reduction of controllability of the PID control, or more specifically, occurrence of overshooting that causes the aircraft 1 to pass through the target landing point 2 due to the relative velocity ($\Delta$Vx, $\Delta$Vy) between the aircraft 1 and the target landing point 2 being large.

In addition, a plurality of the addition values D may be set in accordance with the altitude or control mode of the aircraft 1. The aforementioned configuration allows for increasing the degree of freedom of setting the addition value D. Accordingly, for example, in a case where the aircraft 1 is located in the vicinity of the target landing point 2, the position of the aircraft 1 can be controlled more accurately by setting the addition value D to a large value. Here, a plurality of gains of the PID control may also be set in accordance with the altitude or control mode of the aircraft 1.

In addition, in the first embodiment, the guidance calculation unit 34 (the relative velocity acquisition unit) calculates the relative velocity ($\Delta$Vx, $\Delta$Vy) by adding a value (relative velocity ($\Delta$V2x, $\Delta$V2y)) acquired by applying, to a differential value (relative velocity ($\Delta$V1x, $\Delta$V1y)) of the relative position (Xhgf, Yhgf), a low-pass filter 52L that attenuates frequencies equal to or higher than a predetermined cutoff frequency, and a value (relative velocity ($\Delta$V3x, $\Delta$V3y)) acquired by applying, to the aircraft velocity (Vx, Vy) of the aircraft 1, a high-pass filter 52H that attenuates frequencies below the cutoff frequency.

According to the aforementioned configuration, acquisition of the relative position (Xhgf, Yhgf) between the aircraft 1 and the target landing point 2 and the aircraft velocity (Vx, Vy) of the aircraft 1 allows for calculating the relative velocity ($\Delta$Vx, $\Delta$Vy) between the aircraft 1 and the target landing point 2 without having to acquire the velocity of the marine vessel 5 side on which the target landing point 2 is provided. Accordingly, it is not necessary to perform communication between the aircraft 1 and the marine vessel 5 side on which the target landing point 2 is provided, thereby preventing reduction of control accuracy and response speed due to communication delay. Furthermore, the relative velocity ($\Delta$Vx, $\Delta$Vy) can be accurately calculated by applying the high-pass filter 52H to the aircraft velocity (Vx, Vy) of the aircraft 1 and adding thereto the relative velocity ($\Delta$V3x, $\Delta$V3y) in the high-frequency range due to variation of the aircraft velocity (Vx, Vy) of the aircraft 1, while using, as the relative velocity ($\Delta$V2x, $\Delta$V2y), a highly reliable value in a low-frequency range, which has been acquired by applying the low-pass filter 52L to the differential value of the relative position (Xhgf, Yhgf). Accordingly, it becomes possible to move the aircraft 1 more accurately and faster toward the target landing point 2. In addition, data communication is not required, and therefore the system can be simplified.

In addition, the position control system 100 further includes the camera 10 (imaging device) mounted on the aircraft 1, and the image processing unit 32 and the guidance calculation unit 34 (relative position acquisition unit) calculate the relative position (Xhgf, Yhgf) by image processing using images, captured by the camera 10, of the marker 7 provided at the target landing point 2. According to the aforementioned configuration, the relative position (Xhgf, Yhgf) between the aircraft 1 and the target landing point 2 can be acquired by image processing, whereby it becomes unnecessary to acquire position information from the marine vessel 5 side on which the target landing point 2 is provided. Accordingly, it is unnecessary to perform communication between the aircraft 1 and the marine vessel 5 side on which the target landing point 2 is provided, and therefore the system can be simplified.

Second Embodiment

Figure 11:
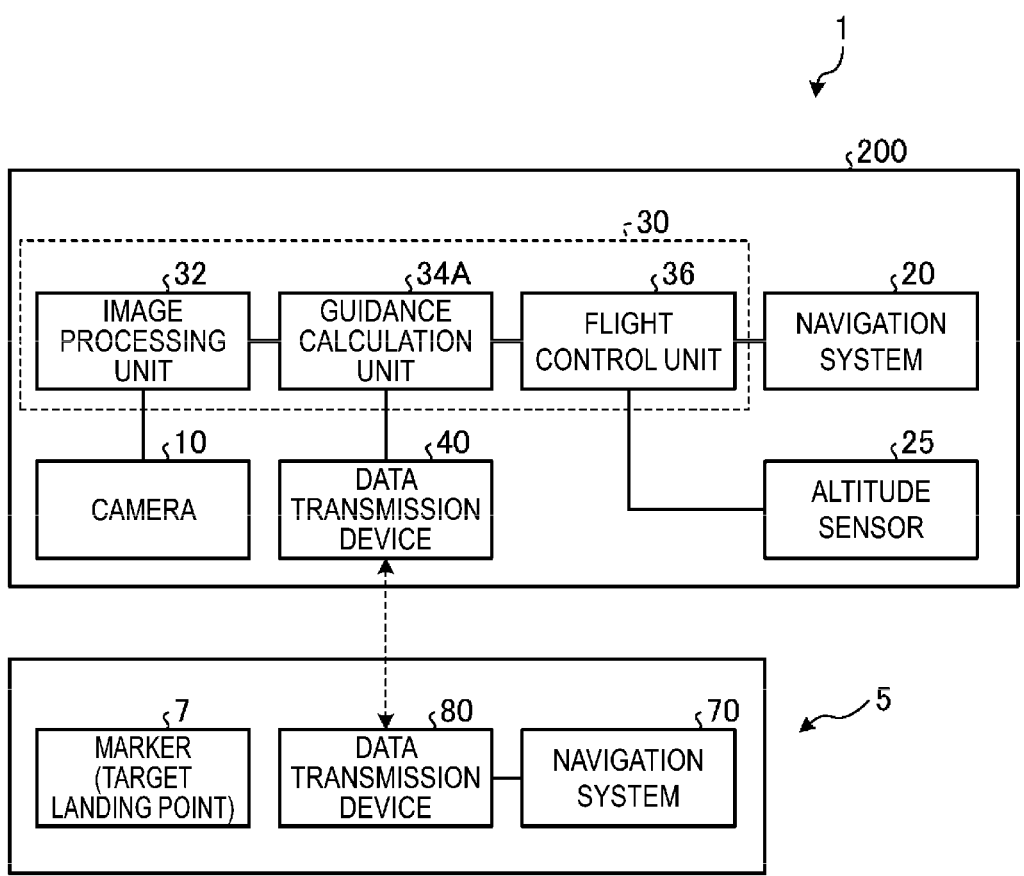
FIG. 11 is a schematic configuration diagram illustrating an example of a position control system according to a second embodiment.

Next, there will be described an aircraft position control system 200 and a position control method according to a second embodiment. FIG. 11 is a schematic configuration diagram illustrating an example of a position control system according to the second embodiment. The position control system 200 according to the second embodiment includes, as illustrated in FIG. 11, a data transmission device 40 in addition to the configuration of the position control system 100 according to the first embodiment. In addition, the position control system 200 includes a guidance calculation unit 34A, in place of the guidance calculation unit 34 of the first embodiment. Other configuration of the position control system 200 is similar to that of the position control system 100 and therefore description thereof is omitted, and like components are indicated by like reference signs.

Additionally, in the second embodiment, the marine vessel 5 having the target attaching point 2 provided thereon includes a navigation system 70, as illustrated in FIG. 11. Similarly to the first embodiment, the navigation system 70 is an inertial navigation system, for example, and the marine vessel 5 acquires, via the inertial navigation system, a ship velocity (Vsx, Vsy), as well as the acceleration, the ship heading $\psi_s$ (see FIG. 6), or the like of the marine vessel 5. The inertial navigation system may include the GPS or may include sensors to acquire various data. In addition, the marine vessel 5 includes a data transmission device 80.

The data transmission device 40 and the data transmission device 80 communicate with each other to exchange information between the aircraft 1 and the marine vessel 5. Specifically, in the second embodiment, the data transmission device 80 of the marine vessel 5 transmits the ship velocity (Vsx, Vsy) of the marine vessel 5 acquired by the navigation system 70 to the data transmission device 40 of the aircraft 1. The data transmission device 40 of the aircraft 1 transmits the received ship velocity (Vsx, Vsy) of the marine vessel 5 to the guidance calculation unit 34A.

Figure 12:
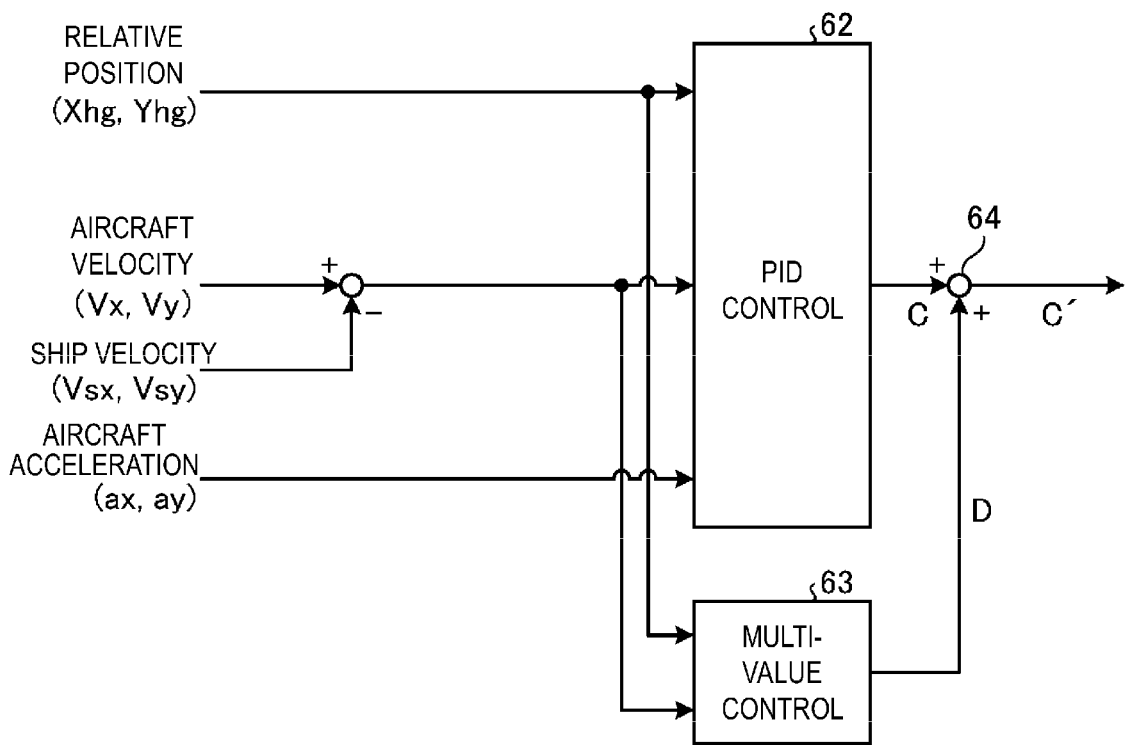
FIG. 12 is a block diagram illustrating an example of a configuration for calculating a manipulated variable of an aircraft by a guidance calculation unit of the second embodiment.

FIG. 12 is a block diagram illustrating an example of a configuration for calculating a manipulated variable of an aircraft by the guidance calculation unit of the second embodiment. In the second embodiment, the guidance calculation unit 34A skips the relative velocity calculation process of the first embodiment. The guidance calculation unit 34A calculates, as illustrated in FIG. 12, a difference between the aircraft velocity (Vx, Vy) of the aircraft 1 acquired by the navigation system 20 and the ship velocity (Vsx, Vsy) of the marine vessel 5, and sets the calculated difference as the relative velocity (ΔVx, ΔVy) of the aircraft 1 with respect to the target landing point 2. On this occasion, the ship velocity (Vsx, Vsy) of the marine vessel 5 is the coordinates of the ship inertial reference frame SG, and therefore subjected to coordinate conversion into the aircraft inertial reference frame HG when calculating the difference. Therefore, the guidance calculation unit 34A functions, also in the second embodiment, as a relative velocity acquisition unit that acquires the relative velocity (ΔVx, ΔVy) between the aircraft 1 and the target landing point 2. The guidance calculation unit 34A calculates the manipulated variable C' by feedback control and multi-value control similar to those in the first embodiment, using the calculated relative velocity (ΔVx, ΔVy). Here, although the Kalman filter 61 is omitted in FIG. 12, the relative position (Xhgf, Yhgf) calculated by applying the Kalman filter 61 to the relative position (Xhg, Yhg) and the relative velocity (ΔVx, ΔVy) may be used, similarly to the first embodiment.

Effect and Advantage of Second Embodiment

According to the aforementioned configuration, the aircraft 1, the aircraft position control system 200, and the position control method of the second embodiment eliminates the necessity of calculating the pseudo-differential values of the relative position (Xhg, Yhg), or performing a calculation process using the low-pass filter 52L and the high-pass filter 52H, as in the first embodiment, when calculating the relative velocity (ΔVx, ΔVy) of the aircraft 1 with respect to the target landing point 2. Therefore, the calculation required for calculating the relative velocity (ΔVx, ΔVy) can be simplified. Here, a filter such as a low-pass filter and a high-pass filter may be applied to the ship velocity (Vsx, Vsy) of the marine vessel 5 which have been subjected to coordinate conversion.

It is assumed in the first and the second embodiments that an image of the marker 7 is captured by the camera 10 and image processing is performed on the captured image, and that the relative position between the aircraft 1 and the target landing point 2 is calculated by the relative position calculation process described above. However, the method for acquiring the relative position between the aircraft 1 and the target landing point 2 is not limited to the foregoing. For example, a laser irradiation device may be mounted on the aircraft 1 to acquire a relative position by irradiating a laser beam toward the target landing point 2 on the marine vessel 5 and receiving reflected waves by the aircraft 1.

In the first and the second embodiments, the guidance calculation units 34 and 34A may measure or estimate the wind velocity around the aircraft 1 or the airspeed, which is the relative velocity between the aircraft 1 and the atmosphere. Subsequently, the guidance calculation units 34 and 34A may adjust each gain of feedback control in accordance with the acquired wind velocity or airspeed. Similarly, the guidance calculation units 34 and 34A may change the setting of the addition value of multi-value control in accordance with the acquired wind velocity or airspeed. Accordingly, it is possible to output a manipulated variable in accordance with the strength of wind around the aircraft 1, and guide the aircraft 1 toward the target landing point 2 more accurately and faster.

Additionally, it is assumed in the first and the second embodiments that the addition value D is set so as to increase or decrease the relative velocity (ΔVx, ΔVy) in multi-value control. However, the addition value D may be set to be added also to the attitude angle of the aircraft 1 and 2, the attitude rate, or the like, which are included in the feedback manipulated variable C.

REFERENCE SIGNS LIST

1 Aircraft
2 Target landing point
5 Marine vessel
7 Marker
10 Camera
20, 70 Navigation system
25 Altitude sensor
30 Control unit
32 Image processing unit
34, 34A Guidance calculation unit
36 Flight control unit
40, 80 Data transmission device
51 Pseudo-differential filter
52 Complementary filter
52H High-pass filter
52L Low-pass filter
100, 200 Position control system

The invention claimed is:
1. An aircraft position control system comprising:
a processor,
wherein the processor is configured to:
acquire a relative position between an aircraft and a target landing point;
acquire a relative velocity of the aircraft with respect to the target landing point; and
control the aircraft by:
calculating a feedback manipulated variable of the aircraft by feedback control so that the aircraft heads toward the target landing point, based on at least the relative position and the relative velocity;
setting an addition value, by referring to a switching line preliminarily provided in a manner passing through an origin of a coordinate plane having orthogonal axes representing the relative position and the relative velocity and separating an acceleration region in which the relative velocity is increased and a deceleration region in which the relative velocity is decreased, wherein the addition value is set so as to: (i) increase the relative velocity when a coordinate point of a current relative position and a current relative velocity is located in the acceleration region with respect to the switching line; or (ii) decrease the relative velocity when the coordinate point is located in the deceleration region with respect to the switching line; and
calculating a manipulated variable of the aircraft by adding the addition value, which has been set, to the feedback manipulated variable.

2. The aircraft position control system according to claim 1, wherein the switching line is a straight line extending on the coordinate plane between a quadrant in which a velocity of the aircraft is higher than a velocity of the target landing point and the aircraft is behind the target landing point in a forward direction, and a quadrant in which the velocity of the aircraft is lower than the velocity of the target landing point, and the aircraft is ahead of the target landing point in the forward direction.

3. The aircraft position control system according to claim 1, wherein the addition value is set in a stepwise manner so that an absolute value thereof becomes: (i) larger for a further distance on the coordinate plane between the coordinate point and the switching line; or (ii) smaller for a closer distance between the coordinate point and the switching line.

4. The aircraft position control system according to claim 1, wherein the processor is configured to calculate the feedback manipulated variable by Proportional-Integral-Derivative (PID) control, and skip an integration operation of the PID control when the relative velocity is equal to or higher than a predetermined value.

5. The aircraft position control system according to claim 1, wherein the processor is configured to set a plurality of the addition values in accordance with an altitude of the aircraft or a control mode of the aircraft.

6. The aircraft position control system according to claim 1, wherein the processor is configured to calculate the relative velocity by adding: (i) a first value acquired by applying, to a differential value of the relative position, a low-pass filter configured to attenuate frequencies equal to or higher than a cutoff frequency; and (ii) a second value acquired by applying, to a velocity of the aircraft, a high-pass filter configured to attenuate frequencies below the cutoff frequency.

7. The aircraft position control system according to claim 1, wherein the processor is configured to acquire a velocity of the aircraft and a velocity of the target landing point, and calculate the relative velocity based on a difference between the velocity of the aircraft and the velocity of the target landing point.

8. The aircraft position control system according to claim 1, further comprising an imaging device configured to be mounted on the aircraft, wherein the processor is configured to perform image processing on a captured image of a marker provided at the target landing point taken by the imaging device, and calculate the relative position.

9. An aircraft comprising the aircraft position control system according to claim 1.

10. An aircraft position control method comprising:
acquiring, by a processor, a relative position between an aircraft and a target landing point;
acquiring, by the processor, a relative velocity of the aircraft with respect to the target landing point;
calculating, by the processor, a feedback manipulated variable of the aircraft by feedback control so that the aircraft heads toward the target landing point, based on at least the relative position and the relative velocity;
setting, by the processor, an addition value, by referring to a switching line preliminarily provided in a manner passing through an origin of a coordinate plane having orthogonal axes representing the relative position and the relative velocity and separating an acceleration region in which the relative velocity is increased and a deceleration region in which the relative velocity is decreased, wherein the addition value is set so as to: (i) increase the relative velocity when a coordinate point of a current relative position and a current relative velocity is located in the acceleration region with respect to the switching line; or (ii) decrease the relative velocity when the coordinate point is located in the deceleration region with respect to the switching line;
calculating, by the processor, a manipulated variable of the aircraft by adding the addition value, which has been set, to the feedback manipulated variable; and
controlling, by the processor, the aircraft automatically to head toward the target landing point, based on at least the feedback manipulated variable.

\* \* \* \* \*